United States Patent
Nagata et al.

(10) Patent No.: US 8,921,259 B2
(45) Date of Patent: Dec. 30, 2014

(54) EXHAUST GAS PURIFICATION CATALYST FOR REMOVING CO OR HC, AND METHOD FOR MANUFACTURING SAME

(75) Inventors: Naoto Nagata, Susono (JP); Hirohito Hirata, Shizuoka-ken (JP); Yusaku Inatomi, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 178 days.

(21) Appl. No.: 13/499,776

(22) PCT Filed: Sep. 29, 2010

(86) PCT No.: PCT/IB2010/002559
§ 371 (c)(1),
(2), (4) Date: Apr. 2, 2012

(87) PCT Pub. No.: WO2011/039632
PCT Pub. Date: Apr. 7, 2011

(65) Prior Publication Data
US 2012/0192550 A1    Aug. 2, 2012

(30) Foreign Application Priority Data

Oct. 2, 2009 (JP) .................................. 2009-230643

(51) Int. Cl.
*B01J 8/02* (2006.01)
*B01J 23/58* (2006.01)
(Continued)

(52) U.S. Cl.
CPC ............... *B01J 23/50* (2013.01); *B01D 53/944* (2013.01); *B01J 35/0013* (2013.01); *B01J 35/006* (2013.01); *B01J 37/0072* (2013.01); *B01J 37/16* (2013.01); *B01D 2255/1023* (2013.01); *B01D 2255/104* (2013.01)
USPC ........ 502/330; 420/463; 420/505; 423/213.2; 423/213.5; 60/299

(58) Field of Classification Search
USPC ............... 502/330; 420/463, 505; 423/213.2, 423/213.5; 60/299
See application file for complete search history.

(56) References Cited

U.S. PATENT DOCUMENTS 4,673,556 A * 6/1987 McCabe et al. ............ 423/213.5
5,292,359 A * 3/1994 Jeng-Shyong et al. ......... 75/351
(Continued)

FOREIGN PATENT DOCUMENTS

EP 0653243 A1 5/1995
EP 0 983 794 A1 3/2000
(Continued)

OTHER PUBLICATIONS

"Inhibition of carbon monoxide on methanol oxidation over y-alumina supported Ag, Pd, and Ag—Pd catalysts," Jin-an Wang et al. Applied Surface Science 147 (1999), pp. 44-51.*
(Continued)

*Primary Examiner* — Patricia L Hailey
(74) *Attorney, Agent, or Firm* — Sughrue Mion, PLLC

(57) ABSTRACT

An exhaust gas purification catalyst for removing CO or HC, which contains a carrier and an alloy of palladium and silver supported on this carrier.

13 Claims, 8 Drawing Sheets

(51) Int. Cl.

| | |
|---|---|
| *B01D 53/56* | (2006.01) |
| *B01D 53/94* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C22C 5/04* | (2006.01) |
| *C22C 5/06* | (2006.01) |
| *C01G 28/00* | (2006.01) |
| *C01G 30/00* | (2006.01) |
| *F01N 3/10* | (2006.01) |
| *B01J 23/50* | (2006.01) |
| *B01J 35/00* | (2006.01) |
| *B01J 37/00* | (2006.01) |
| *B01J 37/16* | (2006.01) |

(56) References Cited

U.S. PATENT DOCUMENTS

| | | | |
|---|---|---|---|
| 5,612,012 A * | 3/1997 | Soma et al. | 423/246 |
| 2003/0027719 A1 | 2/2003 | Kawabata et al. | |
| 2013/0303813 A1* | 11/2013 | Cabiac et al. | 585/277 |

FOREIGN PATENT DOCUMENTS

| | | | | |
|---|---|---|---|---|
| JP | 63-065369 A | | 3/1988 | |
| JP | 07-024318 A | | 1/1995 | |
| JP | 10-216519 A | | 8/1998 | |
| JP | 2002-159859 A | | 6/2002 | |
| JP | 2004-057949 A | | 2/2004 | |
| JP | 2005-052718 A | | 3/2005 | |
| JP | 2005-224704 A | | 8/2005 | |
| JP | 2006-081964 | * | 3/2006 | B01J 29/74 |
| JP | 2006-081964 A | | 3/2006 | |
| JP | 2006-102668 | * | 4/2006 | B01J 29/74 |
| JP | 2006-167540 A | | 6/2006 | |
| JP | 2006-102668 A | | 4/2008 | |
| JP | 2009-011951 A | | 1/2009 | |
| JP | 2011-056379 A | | 3/2011 | |

OTHER PUBLICATIONS

"Catalytic CO oxidation over pumice supported Pd—Ag catalysts," A. M. Venezia et al. Applied Catalysis A: General 211 (2001), pp. 167-174.*

"In situ infrared study of NO reduction over Pd/Al2O3 and Ag—Pd/Al2O3 catalysts under H2-rich and lean-burn conditions," Duane D. Miller et al. Journal of the Taiwan Institute of Chemical Engineers 40 (2009), pp. 613-621.*

"Performance of Ce0.25Zr0.75O2 promoted Pd/Ag/y-Al2O3 catalysts for low-temperature methanol oxidation," Yongjin Luo et al. Fuel 93 (2012), pp. 533-538.*

"Preparation and characterization of PdxAgy/C electrocatalysts for ethanol electrooxidation reaction in alkaline media," Guanglan Li et al. Electrochimica Acta 56 (2011), pp. 7703-7711.*

"Characterization and dynamic behavior of precious metals in automotive exhaust gas purification catalysts," Hirohito Harata et al. Catalysis Today 164 (2011), pp. 467-473.*

"Preparation of colloidal silver-palladium alloys by UV radiation in mixtures of acetone and 2-propanol," Kunio Esumi et al. Colloids and Surfaces A: Physicochemical and Engineering Aspects 109 (1996), pp. 55-62.*

"Studies on catalytic behavior, magnetic property and state of valence electron of Ag-Pd alloys," Jingfa Deng et al. Acta Chimica Sinica, vol. 42, Issue 11 (1984; month unknown), pp. 1133-1138.*

"Exhaust-Catalyst Development for Methanol-Fueled Vehicles," R. W. McCabe et al. Journal of Catalysis 103 (1987), pp. 419-425.*

International Search Report and Written Opinion for corresponding International Patent Application No. PCT/IB2010/002559 mailed Sep. 6, 2011.

Japanese Office Action for corresponding JP Patent Application No. 2009-230643 drafted on Aug. 10, 2011.

* cited by examiner

F I G . 4A
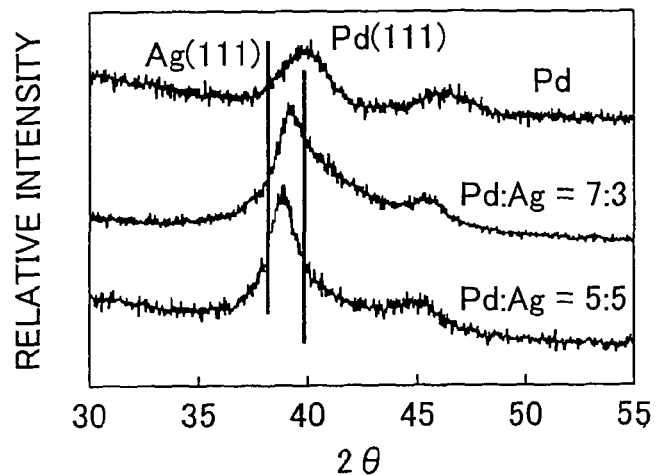
F I G . 4B
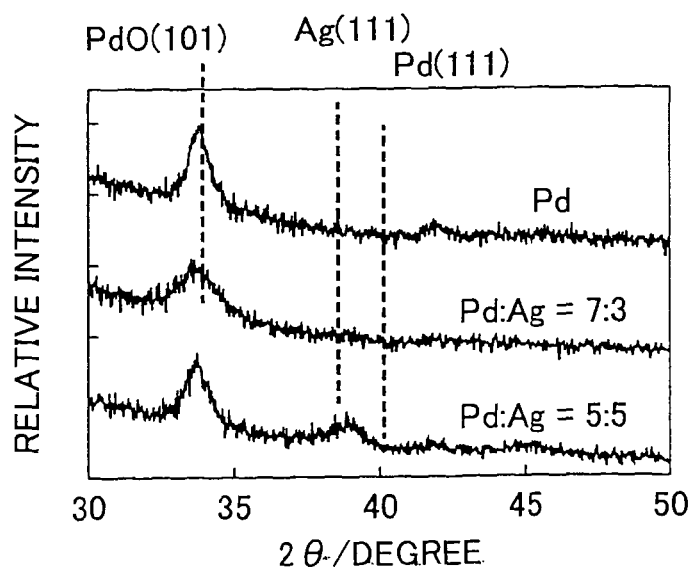

F I G . 5
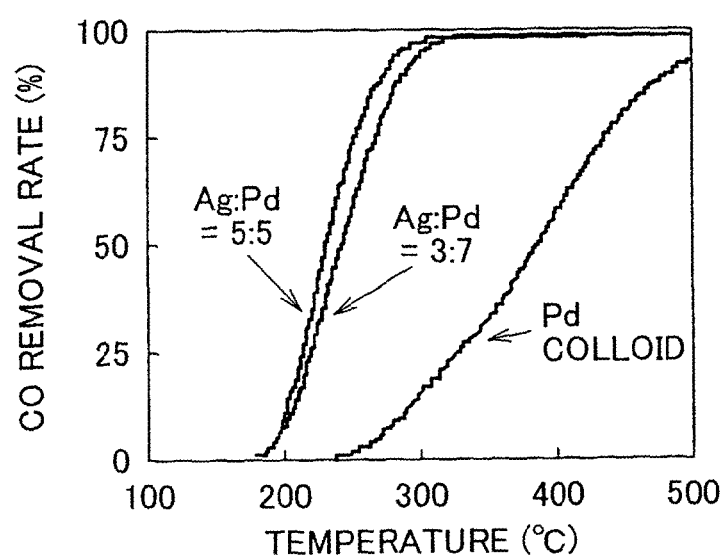

F I G. 7A
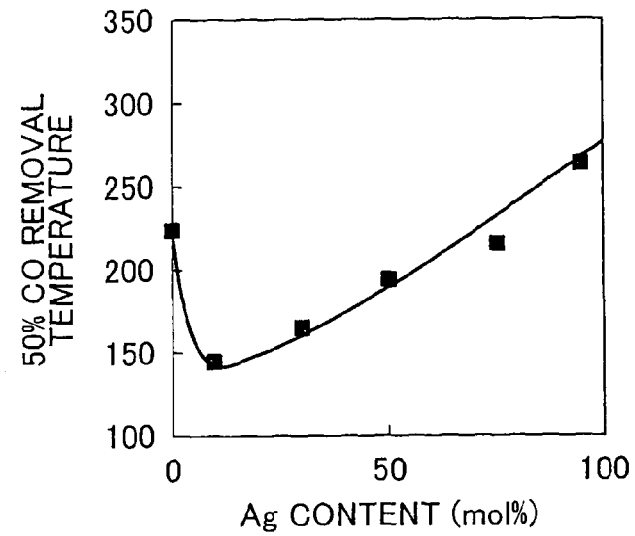
F I G. 7B
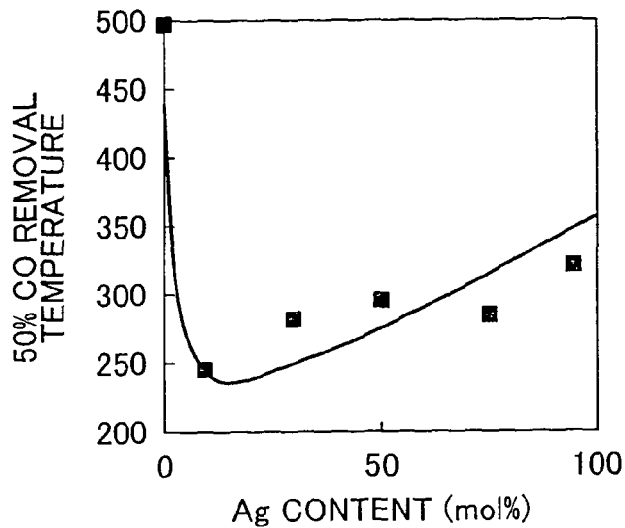
F I G. 7C
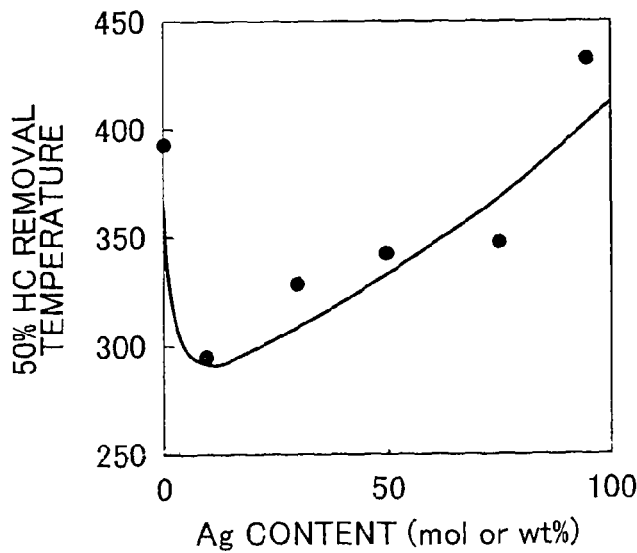

EXHAUST GAS PURIFICATION CATALYST FOR REMOVING CO OR HC, AND METHOD FOR MANUFACTURING SAME

BACKGROUND OF THE INVENTION

1. Field of the Invention

The invention relates to an exhaust gas purification catalyst with excellent oxidation activity, and particularly on exhaust gases that include carbon monoxide (CO) or hydrocarbons (HC), and to a method for manufacturing this catalyst.

2. Description of the Related Art

Exhaust gas from internal combustion engines used in vehicles and so forth contains CO, unburned HC, and other such components that are harmful to humans. Accordingly, the exhaust system of a typical vehicle is provided with an exhaust gas purification device that decomposes and removes harmful components. This device is equipped with an exhaust gas purification catalyst whose main component is a platinum group element such as platinum, rhodium or palladium (Pd) supported on a metal oxide such as alumina. Of these platinum group elements, Pd conventionally has superior performance in the oxidative removal of CO, unburned HC, and the like, and is widely used not only as part of a three-way catalyst for gasoline engines, but also as an oxidation catalyst for diesel engines, and a catalyst for lean-burn engines.

Technology related to metal supported catalysts that are supported on a carrier and contain Pd has been developed. Japanese Patent Application Publication No. 2009-011951 (JP-A-2009-011951) discloses technology for an alloy cluster catalyst in which a Pd-gold (Au) alloy cluster having a composition in which the Pd:Au atomic ratio is 3:1 is supported as a catalyst active species on the surface of a carrier composed of a metal oxide.

JP-A-2009-011951 discloses in working examples the results for simulation of the adsorption energy on a titanium dioxide ($TiO_2$) carrier of a Pd—Au alloy, but there is substantially no disclosure at all of the exhaust gas purification effect, and therefore the degree to which the alloy cluster catalyst disclosed in JP-A-2009-011951 exhibits activity is not considered at all.

SUMMARY OF THE INVENTION

The invention provides an exhaust gas purification catalyst with excellent oxidation activity, and particularly on exhaust gases that include CO or HC, and to a method for manufacturing this catalyst.

A first aspect of the invention relates to an exhaust gas purification catalyst for removing CO or HC, which contains a carrier and an alloy including silver (Ag) and Pd supported on the carrier.

Because this exhaust gas purification catalyst has an alloy that combines Pd and Ag, the Ag prevents the Pd from being poisoned by HC, and as a result the exhaust gas purification effect of the Pd is kept high. Also, with an exhaust gas purification catalyst for removing CO or HC that has a constitution such as this, since the Ag itself has good exhaust gas purification performance, the Pd and Ag together provide a synergistic exhaust gas purification effect.

The element molar ratio of the Pd and Ag in the above-mentioned alloy of the exhaust gas purification catalyst may be such that Pd:Ag is from (99.9 mol %):(0.1 mol %) to (10 mol %):(90 mol %).

Because this exhaust gas purification catalyst has the above-mentioned compositional ratio of Pd and Ag, it strikes a good balance between the exhaust gas purification effect of the Pd and the effect of the Ag at preventing poisoning of the Pd by HC.

A second aspect of the invention relates to a method for manufacturing an exhaust gas purification catalyst for removing CO or HC, including: using a mixture of at least a compound containing elemental Pd, a compound containing elemental Ag, and a protective substance and synthesizing metal microparticles containing Pd and Ag that have both been reduced; and supporting the metal microparticles on a carrier.

The exhaust gas purification catalyst for removing CO or HC pertaining to the invention can be manufactured with an exhaust gas purification catalyst manufacturing method constituted such as this. Also, this purification catalyst manufacturing method is such that in the metal microparticle synthesis step, mixing in the protective substance further enhances the dispersion of metal microparticles and allows a more uniform alloy to be produced than when only a compound containing elemental Pd and a compound containing elemental Ag are mixed.

With this invention, because an alloy combining Pd and Ag is used, the Ag prevents the Pd from being poisoned with HC, and as a result the effect of the Pd at purifying the exhaust gas can be kept high. Also, with this invention, since the Ag itself has good exhaust gas purification performance, the Pd and Ag together provide a synergistic exhaust gas purification effect.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 4A and 4B are energy dipersive x-ray (XRD) profiles of the metal clusters in Working Examples 1 and 2 and Comparative Example 1 and the metal cluster supported catalysts in Working Examples 3 and 4 and Comparative Example 4;

FIG. 5 is a graph of the results of an elevated temperature evaluation experiment conducted for the metal cluster supported catalysts in Working Examples 3 and 4 and Comparative Example 4;

FIGS. 7A, 7B, and 7C are graphs in which evaluation results including the results of an elevated temperature evaluation experiment conducted for the metal cluster supported catalysts in Working Examples 5 and 6 and Comparative Example 5 are plotted with the Ag content on the horizontal axis.

DETAILED DESCRIPTION OF EMBODIMENTS

Figure 1A:
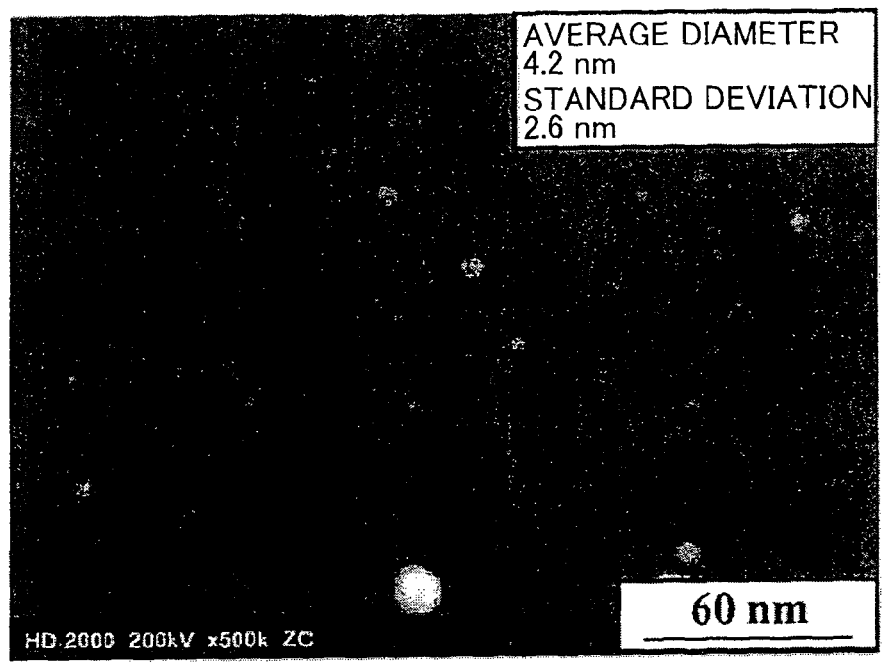
FIGS. 1A and 1B are scanning transmission electron microscopy (STEM) images pertaining to the metal clusters in Working Example 1 and the metal cluster supported catalyst in Working Example 3.

1. Exhaust Gas Purification Catalyst for Removing CO or HC

Conventionally platinum group elements that promote a reaction for removing harmful gases emitted from an internal combustion engine become oxidized, so that their purification activity decreases. As an example of a conventional method for suppressing the oxidation of a platinum group element, which is the active point of a catalyst, there is a conventional method in which a catalyst is reduced by reductant components in the exhaust gas by performing internal combustion engine control utilizing reductive atmosphere operation, but a drawback is that this method leads to lower fuel economy. Meanwhile, conventionally adding second and third components to the active point of a supported catalyst such as an exhaust gas purification catalyst will show dramatic improvement in the oxidation selectivity of exhaust gas and in catalyst activity. For instance, a technique has been proposed in the past in which iron, nickel, or another such group VIII element or the like is added as an auxiliary catalyst component in order to stabilize or promote the action of catalyst components.

The inventors turned their attention to Ag, whose affinity with oxygen is weak, and as a result of diligent effort, found that when a supported catalyst in which an alloy of Pd and Ag is supported on a carrier is used as an exhaust gas purification catalyst, the Ag prevents the Pd from being poisoned by HC, and as a result, the active state of the catalyst provided by the Pd can be maintained for an extended period. The inventors also found that with the exhaust gas purification catalyst pertaining to this invention, the Ag suppresses bonding between the Pd and oxygen atoms, and works to maintain the metallic state (0-valent metal state) of the Pd. Furthermore, the inventors found that since the Ag itself has good exhaust gas purification performance, an alloy of Pd and Ag ends up having a synergistic exhaust gas purification effect due to these two types of metal elements.

The above-mentioned JP-A-2009-011951 discusses a Pd—Au alloy cluster catalyst. The inventors of this invention also examined Pd—Au alloys, and as a result learned that these alloys have particularly low purification performance with exhaust gases containing HC. Detailed experiment results are given in the working examples that follow. It is not clear why Pd—Au alloys have such low purification activity with respect to exhaust gases that contain HC, but some probable explanations are that Au does not work to prevent the hydrocarbon poisoning of Pd, or that Au oxidizes the HC in the exhaust gas, which results in the production of CO, and as a result Au cannot contribute to lowering the exhaust gas concentration.

The term "exhaust gas" in this invention refers to a mixture of one or more gases selected from the group consisting of CO, nitrogen oxides, saturated HC, and unsaturated HC. Other gases besides these, such as those containing oxygen, carbon dioxide, water vapor, or the like, are also encompassed by the term "exhaust gas" in this invention. The exhaust gas purification catalyst pertaining to the this invention is able to oxidize and remove at least one of CO, nitrogen oxides, saturated HC, and unsaturated HC, and particularly CO or HC.

With the exhaust gas purification catalyst of this invention, it is preferable if the element molar ratio of the Pd and Ag in the alloy is such that Pd:Ag is from (99.9 mol %):(0.1 mol %) to (10 mol %):(90 mol %). If the elemental ratio of Pd in the alloy should be less than 10 mol %, the resulting exhaust gas oxidation action will be inadequate, and if the elemental ratio of Ag in the alloy should be less than 0.1 mol %, poisoning of the Pd by HC cannot be adequately suppressed. It is more preferable if the element molar ratio of the Pd and Ag in the alloy is such that Pd:Ag is from (99 mol %):(1 mol %) to (10 mol %):(90 mol %), it is particularly favorable if it is such that Pd:Ag is from (99 mol %):(1 mol %) to (20 mol %):(80 mol %), and it is most preferable if the element molar ratio of the Pd and Ag in the alloy is such that Pd:Ag is from (90 mol %):(10 mol %) to (25 mol %):(75 mol %).

There are no particular restrictions on the carriers that can be used in this invention, so long as the carrier is able to support catalyst particles, but examples include silica, alumina, ceria, titania, zirconia, yttria, magnesia, and compound oxides of these. It is also preferable if the ratio in which the alloy is contained with respect to the total weight of the exhaust gas purification catalyst is from 0.1 to 10.0 wt %.

2. Method for Manufacturing an Exhaust Gas Purification Catalyst for Removing CO or HC The exhaust gas purification catalyst manufacturing method of this invention includes a step of synthesizing metal microparticles and a step of supporting them, but is not necessarily limited to these two steps. The metal microparticle synthesis step and the supporting step will now be described in order.

The "metal microparticle synthesis step" referred to in this invention is a step in which at least a compound containing elemental Pd, a compound containing elemental Ag, and a protective substance are mixed, and this mixture is used to synthesize metal microparticles containing Pd and Ag that have both been reduced. The supporting of the elemental Pd on the carrier is generally accomplished by impregnating an oxide carrier with a solution of a nitrate or a complex salt to disperse a metal compound over the carrier surface, and then drying and calcining this product. However, with a conventional method such as this, although a plurality of catalyst components sometimes form an alloy locally in the course of the particles becoming larger through thermal degradation or the like, it is difficult to form alloy particles with a uniform composition. If a protective substance is further added, as in the metal microparticle synthesis step referred to in this invention, two different kinds of metal elements can be dispersed thoroughly, alloy microparticles are produced by reduction thereof, and the protective substance is calcined and removed in the subsequent supporting step, which allows an alloy microparticle supported catalyst with a uniform composition to be formed.

There are no particular restrictions on the compounds containing elemental Pd and compounds containing elemental Ag that can be used in the manufacturing method of this invention, so long as they are compounds that can be used without impeding the production of a Pd—Ag alloy. Specific examples of compounds containing elemental Pd include Pd chloride, Pd acetate, Pd acetyl acetonate, Pd sulfate, Pd phosphate, chloropalladinic acid, tetranitropalladinic acid, Pd nitrate, dichlorodiammine Pd, tetraammine Pd nitrate, tetraammine Pd chloride, tetraammine Pd mercury salt, trans-diaquadiammine Pd nitrate, dinitrodiammine Pd, bis(ethylenediammine) Pd nitrate, diaqua(ethylenediammine) Pd nitrate, Pd benzonitrile complex, Pd cyclooctadiene complex, and Pd triphenylphosphine complex. Specific examples of compounds containing elemental Ag include Ag perchlorate, Ag chlorate, and other such oxoacids, Ag chloride, Ag bromide, and other such Ag halides, Ag nitrate, Ag sulfate, Ag lactate, Ag oxide, Ag carbonate, Ag acetate, and Ag oxalate.

There are no particular restrictions on the protective substances that can be used in the manufacturing method of this invention, so long as they serve to disperse the above-mentioned metal microparticles, but it is preferable if they are coordinate substances, and are substances that are able to coordinate with both elemental Pd and elemental Ag. Examples of protective substances that can be used in this invention include hydrophilic macromolecules and other such macromolecular compounds, and amphipathic molecules. Examples of hydrophilic macromolecules include polyvinyl alcohol (PVA) and other such hydroxyl group-containing compounds, polyvinyl pyrrolidone (PVP), and other such cyclic amide-containing compounds, cyclic imide-containing compounds, polyacrylic acid (PAA), poly(sodium acrylate), poly(potassium acrylate), crosslinked PAA partial hydrates, acrylic acid/itaconic amide copolymers, and other such carboxyl group-containing compounds, saponified vinyl acetate/acrylic ester copolymers, and other such carboxylic ester compounds, polyacrylamide, partially hydrolyzed polyacrylamide, amide group-containing compounds of partially hydrolyzed polyacrylamide, acrylonitrile copolymers, and other such nitrile group-containing compounds, polyvinylpyridine, polyethyleneimine (PEI), polyallylamine, polyamine, N-(3-aminopropyl)diethanolamine, polyamino acid, polyphosphoric acid, heteropoly acid, and other such water-soluble or hydrophilic macromolecules and copolymers of these, or cyclodextrin, aminopectin, methyl cellulose, gelatin, and other such natural substances. Of these, the use of PVP is preferred. As for amphipathic substances, the solute should have a hydrophilic group and a lipophilic group, and examples include sodium stearate and other such higher aliphatic acid alkali salts, sodium dodecylsulfate and other such alkylsulfates, sodium dodecylsulfonate and other such alkyl sulfonates, sodium ethylbenzenesulfonate and other such alkylarylsulfonates, and other such anionic surfactants, higher amine halates of dodecyltrimethylammonium bromide, dodecyltrimethyl-ammonium bromide, and pyridinium methyl iodide and other such pyridinium alkyl halides, ammonium tetraalkyl iodide and other such tetraammonium salts, and other such cationic surfactants, polyethylene glycol alkyl ether, polyethylene glycol monolaurate, and other such polyethylene glycol fatty acid esters, sorbitan fatty acid esters, and other such nonionic surfactants, and amino acids and other such amphipathic surfactants.

There are no particular restrictions on the method for obtaining metal microparticles that contain Pd and Ag, both of which have been reduced, by using a mixture of at least the above-mentioned compound containing elemental Pd, the above-mentioned compound containing elemental Ag, and the above-mentioned protective substance, but specific examples include a reduction method in which Pd and Ag are reduced. There are no particular restrictions on the "reduction method in which Pd and Ag are reduced" referred to here, so long as it is a reduction reaction in which the Pd and Ag in the above-mentioned compound containing elemental Pd and the above-mentioned compound containing elemental Ag can be reduced to 0-valent Pd and 0-valent Ag, respectively. Specific examples of reduction reactions include a reaction brought about by adding a reductant to a mixture of a compound containing elemental Pd, a compound containing elemental Ag, and a protective substance, and a reaction brought about by subjecting the mixture to a physical reduction method. It is preferable to use as the reductant a liquid that also becomes a dispersant for dispersing the mixture of a compound containing elemental Pd, a compound containing elemental Ag, and a protective substance. There are no particular restrictions on the liquid that becomes a dispersant, so long as it is a liquid at room temperature (15 to 25° C.), but specific examples of liquids that can be used include ethanol, methanol, propanol, butanol, ethylene glycol, glycerin, propylene glycol, isoamyl alcohol, n-amyl alcohol, sec-butyl alcohol, n-butyl alcohol, isobutyl alcohol, allyl alcohol, n-propyl alcohol, 2-ethoxyalcohol, 1,2-hexadecanediol, dimethylformamide, tetrahydrofuran, and aqueous solutions of these. Of these, the use of an ethanol aqueous solution is preferred because it is inexpensive and easy to handle. In addition to liquids that become dispersants, other examples of reductants include hydrogen, sodium borohydride, dimethylamine borane, trimethylamine borane, formic acid, formaldehyde, and hydrazine. Examples of physical reduction methods include heating and the use of visible light, ultraviolet light, gamma ($\gamma$) rays, and ultrasonic waves. One of the above-mentioned reductants and physical reduction methods may be used alone as the reduction reaction that can be used in this invention, or two or more of the above-mentioned reductants and physical reduction methods may be combined.

The "supporting step" referred to in this invention is a step of supporting the above-mentioned metal microparticles on a carrier. In supporting the metal microparticles on the carrier, heating is usually performed, and preferably calcining, but as long as the metal microparticles can be supported on the carrier, this heating operation does not necessarily have to be performed. When heating is performed in this step, the heating temperature is preferably from 200 to 600° C., and most preferably from 250 to 350° C. Performing the heating (and usually calcining) at the above temperature calcines away the protective substance that was protecting the metal atoms, and allows the metal microparticles to be supported on the carrier.

By mixing a compound containing elemental Pd and a compound containing elemental Ag in a favorable molar ratio, a good balance can be struck in the resulting exhaust gas purification catalyst between the exhaust gas purification effect of the Pd and the effect of the Ag at preventing poisoning of the Pd by HC, and from this standpoint it is preferable in the exhaust gas purification catalyst manufacturing method of this invention if the molar ratio of the compound containing elemental Pd and the compound containing elemental Ag is from (99.9 mol %):(0.1 mol %) to (10 mol %):(90 mol %). It is more preferable if the molar ratio of the compound containing elemental Pd and the compound containing elemental Ag is from (99 mol %):(1 mol %) to (10 mol %):(90 mol %). It is particularly preferable if this ratio is from (99 mol %):(1 mol %) to (20 mol %):(80 mol %), and it is most preferable if this ratio is from (90 mol %):(10 mol %) to (25 mol %):(75 mol %).

1. Synthesis of Metal Clusters

Working Example 1

To a reaction vessel, 3.33 g (30.0 mmol) of PVPK-25 (made by Kanto Chemical; with an average molecular weight of 35,000) was added, and completely dissolved with 700 g of ethanol, and then heated to reflux. Then, 0.255 g (1.50 mmol) of Ag nitrate was added to a separate reaction vessel and dissolved in 15 mL of distilled water, and to this was added a solution obtained by dissolving 0.337 g (1.50 mmol) of Pd acetate in 50 mL of ethanol. This ethanol aqueous solution of Pd—Ag was added to an ethanol solution of PVP, and heated to reflux for 3 hours at a bath temperature of 110° C. After the Pd and Ag had been reduced, the reaction solution was allowed to cool to room temperature. This solution was concentrated until the amount of liquid was about 50 mL, which gave a microparticle dispersion (Pd/Ag (5/5) cluster dispersion).

Working Example 2

To a reaction vessel, 3.33 g (30.0 mmol) of PVPK-25 (made by Kanto Chemical; with an average molecular weight of 35,000) was added, and completely dissolved with 700 g of ethanol, and then heated to reflux. Then, 0.153 g (0.90 mmol) of Ag nitrate was added to a separate reaction vessel and dissolved in 15 mL of distilled water, and to this was added a solution obtained by dissolving 0.471 g (2.10 mmol) of Pd acetate in 50 mL of ethanol. This ethanol aqueous solution of Pd—Ag was added to an ethanol solution of PVP, and heated to reflux for 3 hours at a bath temperature of 110° C. After the Pd and Ag had been reduced, the reaction solution was allowed to cool to room temperature. This solution was concentrated until the amount of liquid was about 50 mL, which gave a microparticle dispersion (Pd/Ag (7/3) cluster dispersion).

Comparative Example 1

2.75 g (24.8 mmol) of PVPK-25 (made by Kanto Chemical; with an average molecular weight of 35,000) was added to a reaction vessel, and completely dissolved with 375 g of deionized water. Then, 3.54 g (4.95 mmol) of a $PdCl_2$ aqueous solution (Pd content: 14.9 wt %) and 375 g of ethanol were added. This was heated to reflux for 3 hours at a bath temperature of 110° C. After the Pd had been reduced, the reaction solution was allowed to cool to room temperature. After this, the solution was concentrated until the amount of liquid was about 50 mL, which gave a microparticle dispersion (Pd cluster dispersion).

Comparative Example 2

To a reaction vessel, 2.75 g (24.8 mmol) of PVPK-25 (made by Kanto Chemical; with an average molecular weight of 35,000) was added, and completely dissolved with 375 g of deionized water. Then, 0.96 g (1.49 mmol) of a gold chloride tetrahydrate ($HAuCl_4$) aqueous solution (Au content: 30.4 wt %), 2.47 g (3.46 mmol) of a palladium chloride ($PdCl_2$) aqueous solution (Pd content: 14.9 wt %), and 375 g of ethanol were added. This was heated to reflux for 3 hours at a bath temperature of 110° C. After the Au and Pd had been reduced, the reaction solution was allowed to cool to room temperature. After this, the solution was concentrated until the amount of liquid was about 50 mL, which gave a microparticle dispersion (Pd/Au (7/3) cluster dispersion).

Comparative Example 3

To a reaction vessel, 2.75 g (24.8 mmol) of PVPK-25 (made by Kanto Chemical; with an average molecular weight of 35,000) was added, and completely dissolved with 375 g of deionized water. Then, 0.32 g (0.50 mmol) of an $HAuCl_4$ aqueous solution (Au content: 30.4 wt %), 3.20 g (4.50 mmol) of a $PdCl_2$ aqueous solution (Pd content: 14.9 wt %), and 375 g of ethanol were added. This was heated to reflux for 3 hours at a bath temperature of 110° C. After the Au and Pd had been reduced, the reaction solution was allowed to cool to room temperature. After this, the solution was concentrated until the amount of liquid was about 50 mL, which gave a microparticle dispersion (Pd/Au (9/1) cluster dispersion).

2. Synthesis of Metal Cluster Supported Catalyst 2-1. Synthesis of Supported Catalyst Using Spherical Silica as a Carrier Working Example 3

The Pd/Ag (5/5) cluster dispersion produced in Working Example 1 was added to a reaction vessel, and water was added to dilute the dispersion to 100 mL, after which a stir bar was put in the vessel, and magnetic stirring was performed (dispersion A1). Meanwhile, a specific amount of carrier powder (spherical silica) was added to another reaction vessel, and 50 mL of water was added to disperse the powder (dispersion B). Dispersion B was added to dispersion A1 and heated at 150° C., which removed the dispersion medium (that is, the ethanol aqueous solution). The solids remaining after removal of the dispersion medium were dried for 12 hours at a temperature of 120° C., after which they were pulverized in a mortar and then calcined for 5 hours at 300° C. in the air, which gave a supported catalyst powder. This powder was compacted at a high pressure of 196 MPa to produce sample pellets containing 1 wt % Pd.

Working Example 4

The Pd/Ag (7/3) cluster dispersion produced in Working Example 2 was added to a reaction vessel, and water was added to dilute the dispersion to 100 mL, after which a stir bar was put in the vessel, and magnetic stirring was performed (dispersion A2). After this, the above-mentioned dispersion B was added to dispersion A2, heated, stirred, dried, calcined, and compacted in the same manner as in Working Example 3, which gave sample pellets containing 1 wt % Pd.

Comparative Example 4

The Pd cluster dispersion produced in Comparative Example 1 was added to a reaction vessel, and water was added to dilute the dispersion to 100 mL, after which a stir bar was put in the vessel, and magnetic stirring was performed (dispersion A3). After this, the above-mentioned dispersion B was added to dispersion A3, heated, stirred, dried, calcined, and compacted in the same manner as in Working Example 3, which gave sample pellets containing 1 wt % Pd.

2-2. Synthesis of Supported Catalyst Using Needle-Form γ Alumina as a Carrier

Working Example 5

The Pd/Ag (5/5) cluster dispersion produced in Working Example 1 was added to a reaction vessel, and water was added to dilute the dispersion to 100 mL, after which a stir bar was put in the vessel, and magnetic stirring was performed (dispersion A1). Meanwhile, a specific amount of carrier powder (needle-form gamma alumina) was added to another reaction vessel, and 50 mL of water was added to disperse the powder (dispersion C). Dispersion C was added to dispersion A1 and heated and stirred at 150° C., which removed the dispersion medium (that is, the ethanol aqueous solution). The solids remaining after removal of the dispersion medium were dried for 12 hours at a temperature of 120° C., after which they were pulverized in a mortar and then calcined for 5 hours at 300° C. in the air, which gave a supported catalyst powder in which the total weight of supported metal was 0.5 wt %. This powder was compacted at a high pressure of 196 MPa to produce sample pellets in which the combined proportional content of Pd and Ag was 0.5 wt %.

Working Example 6

The Pd/Ag (7/3) cluster dispersion produced in Working Example 2 was added to a reaction vessel, and water was added to dilute the dispersion to 100 mL, after which a stir bar was put in the vessel, and magnetic stirring was performed (dispersion A2). After this, the above-mentioned dispersion C was added to dispersion A2, heated, stirred, dried, calcined, and compacted in the same manner as in Working Example 5, which gave sample pellets in which the combined proportional content of Pd and Ag was 0.5 wt %.

Comparative Example 5

The Pd cluster dispersion produced in Comparative Example 1 was added to a reaction vessel, and water was added to dilute the dispersion to 100 mL, after which a stir bar was put in the vessel, and magnetic stirring was performed (dispersion A3). After this, the above-mentioned dispersion C was added to dispersion A3, heated, stirred, dried, calcined, and compacted in the same manner as in Working Example 5, which gave sample pellets containing 0.5 wt % Pd.

Comparative Example 6

The Pd/Au (7/3) cluster dispersion produced in Comparative Example 2 was added to a reaction vessel, and water was added to dilute the dispersion to 100 mL, after which a stir bar was put in the vessel, and magnetic stirring was performed (dispersion A4). After this, the above-mentioned dispersion C was added to dispersion A4, heated, stirred, dried, calcined, and compacted in the same manner as in Working Example 5, which gave sample pellets in which the combined proportional content of Pd and Au was 0.5 wt %.

Comparative Example 7

The Pd/Au (9/1) cluster dispersion produced in Comparative Example 3 was added to a reaction vessel, and water was added to dilute the dispersion to 100 mL, after which a stir bar was put in the vessel, and magnetic stirring was performed (dispersion A5). After this, the above-mentioned dispersion C was added to dispersion A5, heated, stirred, dried, calcined, and compacted in the same manner as in Working Example 5, which gave sample pellets in which the combined proportional content of Pd and Au was 0.5 wt %.

The metal cluster supported catalysts were analyzed and their catalytic activity evaluated as follows. The samples used for analysis and evaluation are listed in Table 1. The metal cluster dispersions of Comparative Examples 2 and 3 were the raw materials for the metal cluster supported catalysts of Comparative Examples 6 and 7, respectively, and the metal cluster dispersions of Comparative Examples 2 and 3 were not themselves used for analysis and evaluation.

TABLE 1

| | | STEM analysis | XRD analysis | Catalytic activity evaluation 1 | Catalytic activity evaluation 2 |
|---|---|---|---|---|---|
| Metal cluster dispersion | Working Ex. 1 | good | good | — | — |
| | Working Ex. 2 | good | good | — | — |
| Metal cluster supported catalyst | Working Ex. 3 | good | good | good | — |
| | Working Ex. 4 | good | good | good | — |
| | Working Ex. 5 | — | — | — | good |
| | Working Ex. 6 | — | — | — | good |
| Metal cluster dispersion | Comp. Ex. 1 | — | good | — | — |
| | Comp. Ex. 2 | — | — | — | — |
| | Comp. Ex. 3 | — | — | — | — |
| Metal cluster supported catalyst | Comp. Ex. 4 | — | good | good | — |
| | Comp. Ex. 5 | — | — | — | good |
| | Comp. Ex. 6 | — | — | — | good |
| | Comp. Ex. 7 | — | — | — | good |

3. Analysis of Metal Cluster Supported Catalysts 3-1. STEM Analysis

The metal clusters of Working Examples 1 and 2 and the metal cluster supported catalysts of Working Examples 3 and 4 were subjected to STEM analysis using an HD-2000 (made by Hitachi; acceleration voltage: 200 kV). The microparticle dispersions of Working Examples 1 and 2 were diluted with ethanol, applied in drops onto a molybdenum grid, and dried to prepare measurement samples.

Figure 1B:
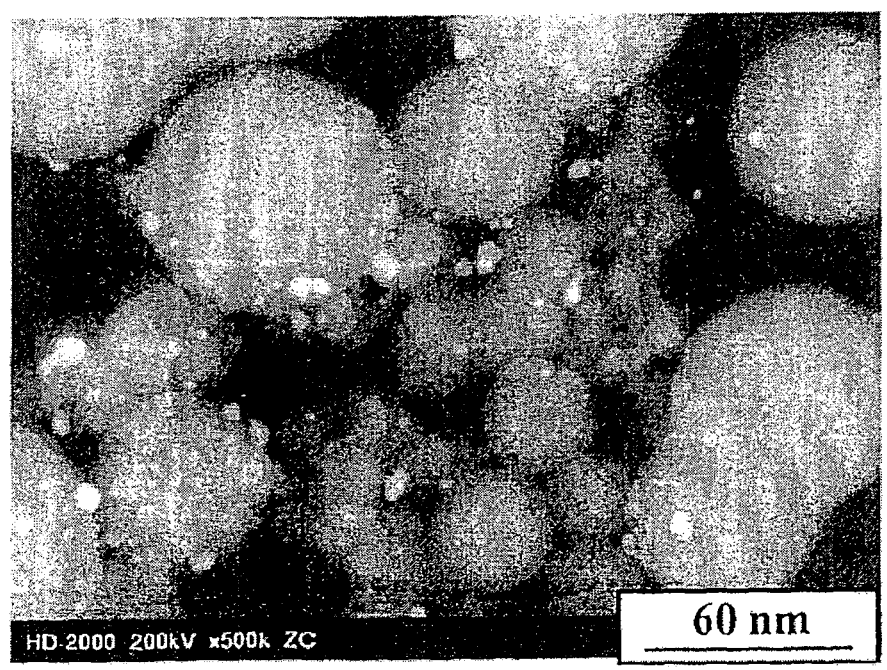

FIGS. 1A and 1B are STEM images pertaining to the metal cluster in Working Example 1, etc. FIG. 1A is a STEM image pertaining to the metal cluster supported catalyst in Working Example 1, and FIG. 1B is a STEM image pertaining to the metal cluster in Working Example 3. The average diameter of the metal clusters in Working Example 1 (that is, before being supported) was 4.2 nm, and the standard deviation of the particle size of the metal clusters was 2.6 nm.

Figure 2A:
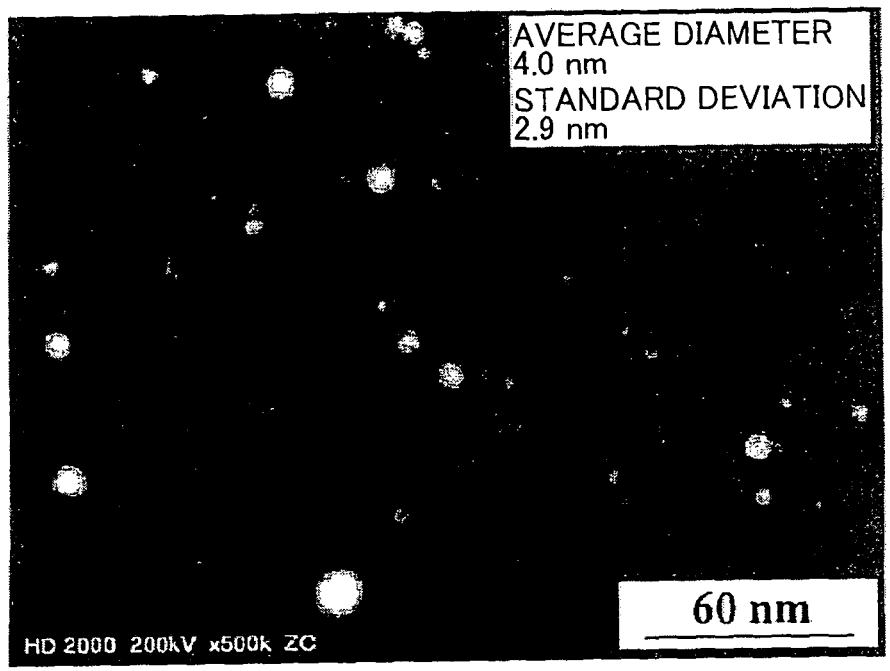
FIGS. 2A and 2B are STEM images pertaining to the metal clusters in Working Example 2 and the metal cluster supported catalyst in Working Example 4.
Figure 2B:
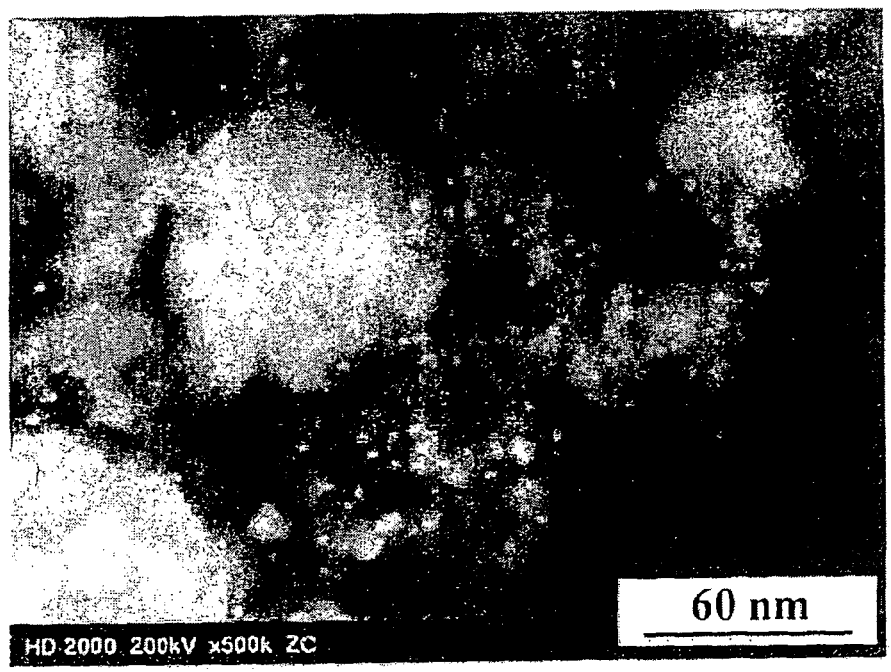

FIGS. 2A and 2B are STEM images pertaining to the metal clusters in Working Example 2, etc. FIG. 2A is a STEM image pertaining to the metal clusters in Working Example 2, and FIG. 2B is a STEM image pertaining to the metal cluster supported catalyst in Working Example 4. The average diameter of the metal clusters in Working Example 2 (that is, before being supported) was 4.0 nm, and the standard deviation of the particle size of the metal clusters was 2.9 nm.

Figure 3A:
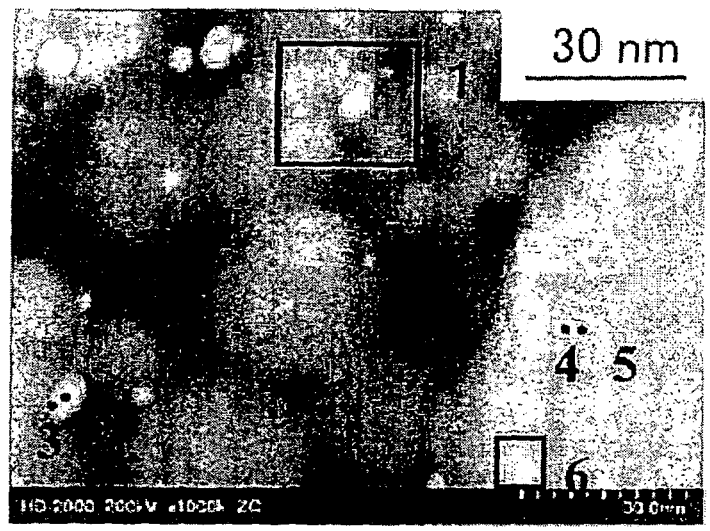
FIGS. 3A and 3B are respectively a diagram of six measurement points in compositional analysis by energy dispersive x-ray (EDX) for the metal cluster supported catalyst of Working Example 3, and a bar graph of the elemental compositional ratio of Pd and Ag out of the compositional analysis results by EDX.
Figure 3B:
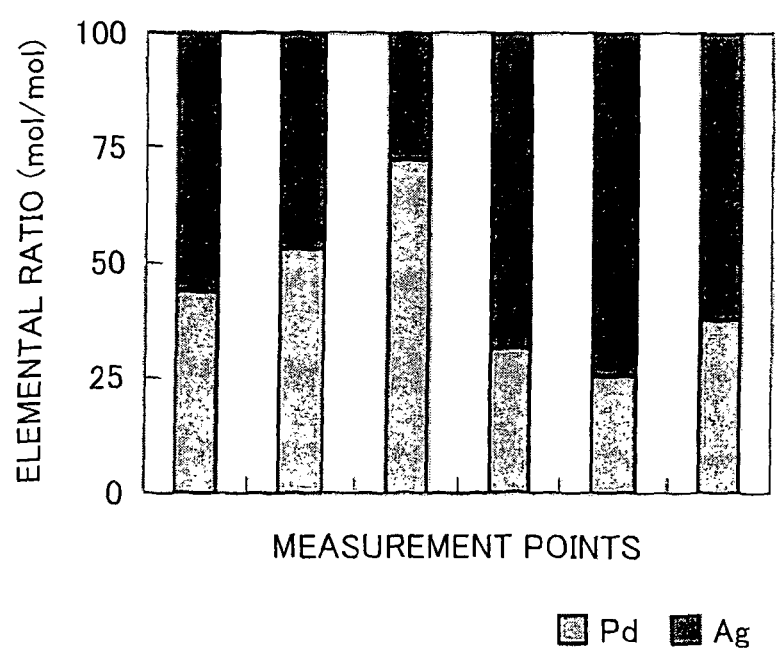

FIG. 3A is a diagram of six measurement points in compositional analysis by STEM-EDX for the metal cluster supported catalyst of Working Example 3, and FIG. 3B is a bar graph of the elemental compositional ratio of Pd and Ag out of the compositional analysis results by EDX. As shown in FIG. 3B, there is elemental Pd (the gray regions in the bar graph) and elemental Ag (the black regions in the bar graph) at all of the measurement points, and if we average the ratios in which these are present, we find that the value is close to 50/50.

3-2. XRD Analysis

The metal clusters of Working Examples 1 and 2 and Comparative Example 1, and the metal cluster supported catalysts of Working Examples 3 and 4 and Comparative Example 4 were subjected to XRD analysis using an RINT2000 (made by Rigaku). The detailed measurement conditions were as follows.

X-ray source: Copper-Potassium (CuK)α
sampling interval: 0.02 deg.
scanning rate: 2.4 deg./min.
diffusion slit (DS): ⅔ deg.
scattering slit (SS): ⅔ deg.
receiving slit (RS): RS (mm)
tube voltage: 50 kV
tube current: 300 mA FIG. 4A is an XRD profile of the metal clusters in Working Examples 1 and 2 and Comparative Example 1. Starting from the top in FIG. 4A, the XRD profiles are for Comparative Example 1, Working Example 2, and Working Example 1, respectively. In the XRD profile for Comparative Example 1 (at the top), the Pd(111) plane diffraction peak appears at 39.9°, whereas in the XRD profiles for Working Example 1 (at the bottom) and Working Example 2 (in the middle), the (111) plane diffraction peak appears at 38.8° (Working Example 1) or 39.1° (Comparative Example 2). These values close to 39° are values between the Pd(111) plane diffraction peak value (39.9°) and the Ag(111) plane diffraction peak value (38.2°), which suggests that alloy microparticles of both Pd and Ag were obtained in the microparticle dispersions of Working Examples 1 and 2.

FIG. 4B is an XRD profile of the metal cluster supported catalysts in Working Examples 3 and 4 and Comparative Example 4. Starting from the top in FIG. 4B, the XRD profiles are for Comparative Example 4, Working Example 4, and Working Example 3, respectively. In the XRD profile for Comparative Example 4 (at the top), the palladium oxide (PdO) (101) plane diffraction peak, which did not appear in the XRD profile for Comparative Example 1 (at the top in FIG. 4A), appears strongly at 33.8°, whereas in the XRD profiles for Working Example 3 (at the bottom) and Working Example 4 (in the middle), the intensity of the peak at 33.8° was relatively low. These results suggest that whereas the Pd ended up being completely oxidized in the calcination step with the metal cluster supported catalyst of Comparative Example 4, with the metal cluster supported catalysts of Working Examples 3 and 4 Ag is included in the clusters, and this somewhat reduced the oxidation of the Pd.

4. Catalytic Activity Evaluation 1

Using 2 g of pellets of the metal cluster supported catalysts of Working Examples 3 and 4 and Comparative Example 4, a temperature elevation evaluation was conducted by passing through a sample gas containing 1% CO and 10% oxygen (with the balance being nitrogen) at a total flow rate of 10 L/min. This temperature elevation evaluation experiment was use to evaluate the CO oxidation activity of a catalyst; the lower is the temperature at which the CO is oxidized, the higher the catalytic activity is considered to be. FIG. 5 is a graph of the results of subjecting catalysts to this temperature elevation evaluation experiment, in which the vertical axis is the CO removal rate (%), and the horizontal axis is the temperature (° C.). As can be seen from this graph, the CO oxidation commencement temperature in Comparative Example 4 ("Pd colloid" in the graph) is 210° C., and the 50% CO oxidation temperature is at least 300° C., whereas the CO oxidation commencement temperatures in Working Example 3 ("Ag:Pd=5:5" in the graph) and Working Example 4 ("Ag:Pd=3:7" in the graph) are both lower than 200° C., and the 50% CO oxidation temperature in both working examples is less than 250° C. This confirms that the catalysts of Working Examples 3 and 4, which contained an alloy of Pd and Ag, can both oxidize CO from a lower temperature than can the catalyst of Comparative Example 4, which contained Pd but not Ag. This suggests that the presence of Ag increases catalytic activity.

5. Catalytic Activity Evaluation 2

Using 2 g of pellets of the metal cluster supported catalysts of Working Examples 5 and 6 and Comparative Examples 5 to 7, a temperature elevation evaluation was conducted by passing through a sample gas with the composition shown in Table 2 below (with the balance being nitrogen) at a total flow rate of 10 L/min. The "$C_3H_6$" in Table 2 below refers to propylene.

TABLE 2

| $O_2$ | CO | NO | $C_3H_6$ | $CO_2$ | $H_2O$ |
|---|---|---|---|---|---|
| 10% | 600 ppm | 200 ppm | 1050 ppm | 10% | 3% |

Figure 6A:
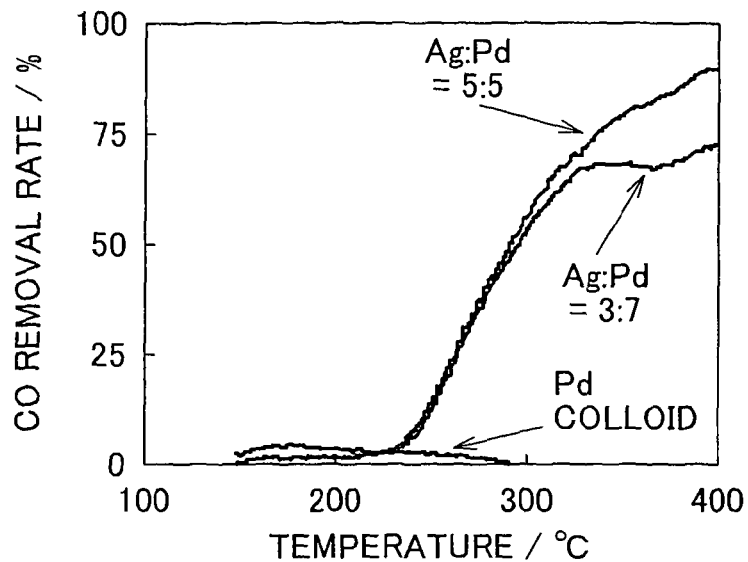
FIGS. 6A and 6B are graphs of the results of an elevated temperature evaluation experiment conducted for the metal cluster supported catalysts in Working Examples 5 and 6 and Comparative Example 5.
Figure 6B:
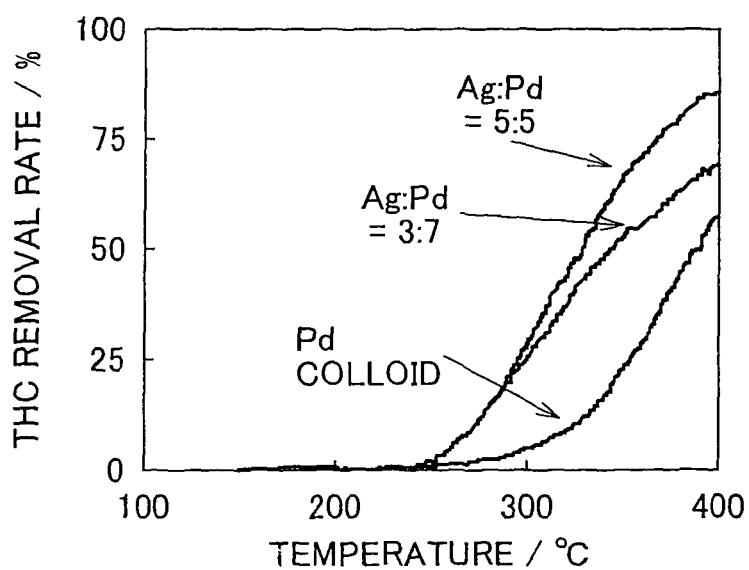
Figure 8:
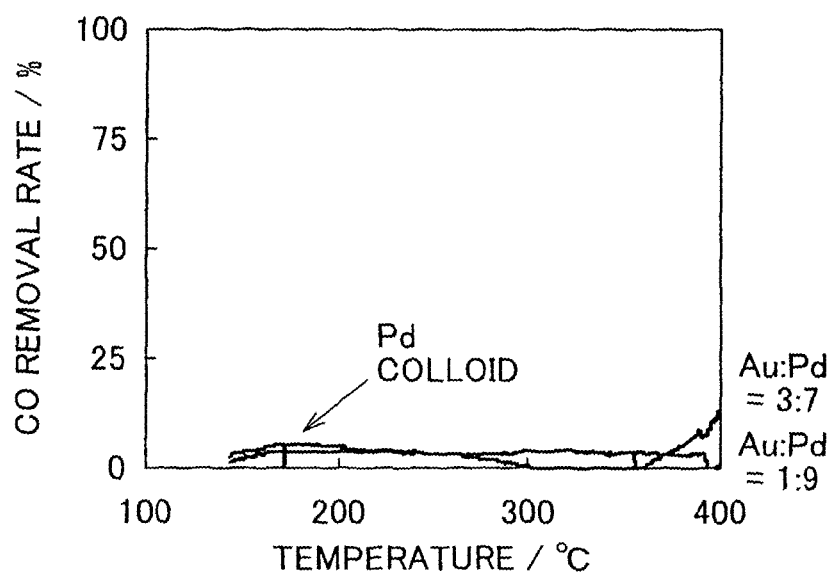
FIG. 8 is a graph of the results of an elevated temperature evaluation experiment conducted for the metal cluster supported catalysts in Comparative Examples 5 to 7.

FIGS. 6A and 6B are graphs of the results of subjecting the catalysts of Working Examples 5 and 6 and Comparative Example 5 to a temperature elevation evaluation experiment, in which the vertical axis is the carbon monoxide removal rate (%) (FIG. 6A) or the total hydrocarbon removal rate (%) (FIG. 6B), and the horizontal axis is the temperature (° C.). FIG. 8 is a graph of the results of subjecting the catalysts of Comparative Examples 5 to 7 to a temperature elevation evaluation experiment, in which the vertical axis is the carbon monoxide removal rate (%), and the horizontal axis is the temperature (° C.). As can be seen from the graphs in FIGS. 6A and 8, the carbon monoxide removal rate in Comparative Example 5 ("Pd colloid" in FIG. 6A) decreased markedly as the temperature rose, and the carbon monoxide removal rate in Comparative Example 6 ("Au:Pd=3:7" in FIG. 8) and Comparative Example 7 ("Au:Pd=1:9" in FIG. 8) rose, but remained substantially at 0%. In contrast, the carbon monoxide removal rate in Working Example 5 (Ag:Pd=5:5 in FIG. 6A) and Working Example 6 (Ag:Pd=3:7 in FIG. 6A) rose along with temperature, with a particularly sharp increase in the carbon monoxide oxidation characteristics seen at a boundary near 250° C. In particular, at high temperatures of 300° C. or above, the CO removal rate of the metal cluster supported catalyst of Working Example 5 was higher than the CO removal rate of the metal cluster supported catalyst of Working Example 6. As can be seen from the graph in FIG. 6B, the total hydrocarbon oxidation commencement temperature in Comparative Example 5 ("Pd colloid" in the graph) was close to 300° C., and the total hydrocarbon removal rate did not reach 60% even when the temperature was raised to 400° C. In contrast, the total hydrocarbon oxidation commencement temperatures in Working Example 5 ("Ag:Pd=5:5" in the graph) and Working Example 6 ("Ag:Pd=3:7" in the graph) were both close to 250° C., and the total hydrocarbon removal rates were both at least 60% when the temperature was raised to 400° C. In particular, the total hydrocarbon removal rate of the metal cluster supported catalyst of Working Example 5 was a value that exceeded 80% at 400° C. The above tells us that a conventional catalyst containing only Pd as its catalyst metal, or a conventional catalyst containing an alloy of Pd and Au, exhibits almost no oxidation activity under a mixed gas atmosphere having a composition close to that of the gas emitted from an actual diesel engine. It is believed that the oxidation activity of these conventional catalysts is lowered when the Pd is poisoned by propylene in the mixed gas. On the other hand, the exhaust gas purification catalyst of the invention, which contains an alloy of Pd and Ag, was found to exhibit superior oxidation activity, with no hydrocarbon poisoning of the Pd.

FIGS. 7A, 7B, and 7C are graphs in which evaluation results including the results of an elevated temperature evaluation experiment conducted for the metal cluster supported catalysts in Working Examples 5 and 6 and Comparative Example 5 are plotted with the Ag content on the horizontal axis. FIG. 7A shows the results when a sample gas containing 1% CO and 10% oxygen (with the balance being nitrogen) was passed through at a total flow rate of 10 L/min, while FIGS. 7B and 7C show the results when a sample gas with the composition shown in Table 2 above was passed through at a total flow rate of 10 L/min. FIGS. 7A and 7B are graphs in which the 50% CO removal temperature (° C.) is plotted on the vertical axis, and FIG. 7C is a graph in which the 50% hydrocarbon removal temperature (° C.) is plotted on the vertical axis. In all the graphs of FIGS. 7A to 7C, the plot for a Ag content of 0 mol % shows the experiment results obtained using the catalyst of Comparative Example 5, and it is shown that the lower is the 50% exhaust gas removal temperature, the higher is the exhaust gas purification performance of the catalyst. As can be seen from FIG. 7A, when the element molar ratio between Pd and Ag in the alloy is such that Pd:Ag is from (90 mol %):(10 mol %) to (25 mol %):(75 mol %), the CO removal performance is better than when the Ag content is 0 mol % (Comparative Example 5). Also, as can be seen from FIG. 7B, when a hydrocarbon is also present, the Pd and Ag alloy catalysts of all compositional ratios can be seen to have better CO removal performance than when the Ag content is 0 mol % (Comparative Example 5). Based on the above results, it is preferable from the standpoint of obtaining superior CO oxidation activity if the element molar ratio between the Pd and Ag in the alloy of the exhaust gas purification catalyst of the invention is such that Pd:Ag is from (99.9 mol %):(0.1 mol %) to (20 mol %):(80 mol %). Meanwhile, as can be seen from FIG. 7C, when the element molar ratio between the Pd and Ag in the alloy is such that Pd:Ag is from (90 mol %):(10 mol %) to (25 mol %):(75 mol %), the propylene removal performance will be better than when the Ag content is 0 mol % (Comparative Example 5). Based on the above results, it is preferable from the standpoint of obtaining superior hydrocarbon oxidation activity if the element molar ratio between the Pd and Ag in the alloy of the exhaust gas purification catalyst of the invention is such that Pd:Ag is from (99.9 mol %):(0.1 mol %) to (10 mmol %):(90 mol %).

The exhaust gas purification catalysts in the above working examples may be applied to exhaust gas purification catalyst devices in internal combustion engines equipped with an internal combustion engine main body, an exhaust pipe through which the exhaust gas emitted from the internal combustion engine main body flows, and an exhaust gas purification catalyst device that is provided to the exhaust pipe. The internal combustion engine here may be either a diesel engine or a gasoline engine.

The invention claimed is:

1. An exhaust gas purification catalyst for removing CO or HC, comprising:
   a carrier; and
   an alloy metal cluster of palladium and silver supported on the carrier,
   wherein in an XRD profile of the catalyst under measurement conditions of a copper-potassium (CuK) α X-ray source, a 50 kV tube voltage and 300 mA tube current, a (111) plane diffraction peak appears between 38.8° and 39.1° and neither a Pd(111) plane diffraction peak nor a Ag(111) plane diffraction peak appears, and
   an average diameter of the metal cluster supported on the carrier is 4.0 nm to 4.2 nm.

2. The exhaust gas purification catalyst according to claim 1, wherein the element molar ratio of the palladium and silver in the alloy is such that Pd:Ag is from (99.9 mol %): (0.1 mol %) to (10 mol %):(90 mol %).

3. The exhaust gas purification catalyst according to claim 2, wherein the element molar ratio of the palladium and silver in the alloy is such that Pd:Ag is from (99 mol %): (1 mol %) to (10 mol %):(90 mol %).

4. The exhaust gas purification catalyst according to claim 3, wherein the element molar ratio of the palladium and silver in the alloy is such that Pd:Ag is from (99 mol %): (1 mol %) to (20 mol %):(80 mol %).

5. The exhaust gas purification catalyst according to claim 4, wherein the element molar ratio of the palladium and silver in the alloy is such that Pd:Ag is from (90 mol %): (10 mol %) to (25 mol %):(75 mol %).

6. The exhaust gas purification catalyst according to claim 1, wherein the ratio in which the alloy is contained with respect to the total weight of the exhaust gas purification catalyst is from 0.1 to 10 wt %.

7. An internal combustion engine, comprising:
   an internal combustion engine main body;
   an exhaust pipe that is connected to the internal combustion engine main body and through which flows exhaust gas emitted from the internal combustion engine main body; and
   an exhaust gas purification catalyst device that is provided to the exhaust pipe and includes the exhaust gas purification catalyst according to claim 1.

8. A method for manufacturing an exhaust gas purification catalyst for removing CO or HC, comprising:
   using a mixture of at least a compound containing elemental palladium, a compound containing elemental silver, and a protective substance and synthesizing metal microparticles containing palladium and silver that have both been reduced; and
   supporting the metal microparticles on a carrier,
   such that in an XRD profile of the catalyst under measurement conditions of a copper-potassium (CuK) α X-ray source, a 50 kV tube voltage and 300 mA tube current, a (111) plane diffraction peak appears between 38.8° and 39.1° and neither a Pd(111) plane diffraction peak nor a Ag(111) plane diffraction peak appears, and
   an average diameter of the metal microparticles supported on the carrier is 4.0 nm to 4.2 nm.

9. The method for manufacturing an exhaust gas purification catalyst according to claim 8, wherein the protective substance is a substance capable of coordinating with elemental palladium and elemental silver.

10. The method for manufacturing an exhaust gas purification catalyst according to claim 8, wherein a reductant and a physical reduction method are used to reduce the palladium ions and silver ions in the mixture into 0-valent palladium and 0-valent silver.

11. The method for manufacturing an exhaust gas purification catalyst according to claim 8, wherein the metal microparticles contain an alloy of palladium and silver.

12. The method for manufacturing an exhaust gas purification catalyst according to claim 8, wherein the protective substance comprises hydrophilic macromolecules or amphipathic molecules.

13. The method for manufacturing an exhaust gas purification catalyst according to claim 8, wherein the protective substance is polyvinyl pyrrolidone (PVP).

* * * * *